(12) United States Patent
Edwards

(10) Patent No.: US 12,722,771 B2
(45) **Date of Patent: *Sep. 1, 2026**

(54) AIRCRAFT STRUCTURE

(71) Applicant: AIRBUS OPERATIONS LIMITED, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 211 days.

This patent is subject to a terminal disclaimer.

(21) Appl. No.: 18/302,039

(22) Filed: Apr. 18, 2023

(65) Prior Publication Data

US 2023/0331369 A1 Oct. 19, 2023

(30) Foreign Application Priority Data

Apr. 19, 2022 (GB) ..................................... 2205706

(51) Int. Cl.

| | |
|---|---|
| ***B64C 3/26*** | (2006.01) |
| ***B29C 65/00*** | (2006.01) |
| ***B29C 65/52*** | (2006.01) |
| ***B64F 5/10*** | (2017.01) |

(52) U.S. Cl.

CPC ................ *B64C 3/26* (2013.01); *B29C 65/52* (2013.01); *B29C 66/1122* (2013.01); *B29C 66/21* (2013.01); *B64F 5/10* (2017.01)

(58) Field of Classification Search

CPC ............ B29C 66/21; B29C 66/22–229; B29C 66/23–234; B29C 66/24–246; B29C 66/20–246; B32B 7/14; B64F 5/10; B64C 1/12; B64C 3/26

See application file for complete search history.

(56) References Cited

U.S. PATENT DOCUMENTS

| | | | |
|---|---|---|---|
| 4,488,619 A | 12/1984 | O'Neill | |
| 5,830,308 A | 11/1998 | Reichard | |
| 2018/0017090 A1 | 1/2018 | Garhart | |
| 2018/0281923 A1 | 10/2018 | Walker et al. | |
| 2018/0339502 A1* | 11/2018 | Nguyen | B32B 7/12 |
| 2020/0198295 A1* | 6/2020 | Fuentes | B32B 37/1292 |
| 2021/0077320 A1 | 3/2021 | Tsang et al. | |
| 2021/0170714 A1 | 6/2021 | Pelletier et al. | |

FOREIGN PATENT DOCUMENTS

| | | |
|---|---|---|
| CN | 208944478 | 6/2019 |
| GB | 2079626 | 1/1982 |
| WO | 2016/130433 A1 | 8/2016 |
| WO | 2018/208347 A1 | 11/2018 |

OTHER PUBLICATIONS

European Search Report cited in EP 23168401.0 mailed Sep. 26, 2023, 10 pages.
Combined Search and Examination Report for GB2205706.1, dated Oct. 27, 2022, 5 pages.

* cited by examiner

*Primary Examiner* — Rebecca L Grusby
(74) *Attorney, Agent, or Firm* — Nixon & Vanderhye P.C.

(57) ABSTRACT

An aircraft structure including a first surface and a second surface. The first surface and the second surface are bonded together via a plurality of discrete adhesive sections arranged in a herringbone pattern or a support between the first surface and the second surface, wherein the support includes spaced apart ribs with discrete adhesive sections located between the spaced apart ribs.

15 Claims, 8 Drawing Sheets

AIRCRAFT STRUCTURE

RELATED APPLICATION

This application incorporates by reference and claims priority to United Kingdom patent application GB 2205706.1, filed Apr. 19, 2022.

TECHNICAL FIELD

The present invention relates to aircraft structures, a method of bonding a first surface to a second surface and an aircraft.

BACKGROUND

Structures, for example aircraft structures, are secured together during assembly. It may be desirable to provide an improved way in which to secure components of the structures together.

SUMMARY

According to a first aspect of the present invention, there is provided an aircraft structure comprising: a first surface and a second surface, wherein the first surface and the second surface are bonded together via a plurality of discrete adhesive sections arranged in a herringbone pattern.

The discrete adhesive sections may form a discontinuous bond line between the first surface and the second surface. The discontinuous bond line may help to prevent cracks from propagating along the bond line. The herringbone pattern of discrete adhesive sections may help to provided improved structural support should a crack occur in one of the discrete adhesive sections. Due to the overlap between adjacent adhesive sections in the herringbone pattern, if a crack appears in one of the adhesive sections, the load may be redistributed to the surrounding adhesive sections. This may also help to provide redundancy in the event of a crack in one of the discrete adhesive sections.

Optionally, adjacent discrete adhesive sections are spaced apart from each other in a direction substantially parallel to the first surface. The discrete adhesive sections being spaced apart may help to prevent cracks from propagating along the bond line.

Optionally, the adjacent discrete adhesive sections are spaced apart by at least 0.1 mm. Optionally, the adjacent discrete adhesive sections are spaced apart by at least 0.5 mm. Optionally, the adjacent discrete adhesive sections are spaced apart by at least 1 mm.

Optionally, the aircraft structure comprises a support located between the adjacent discrete adhesive sections. The support may help retain the distance between discrete adhesive sections during curing. This may help to prevent adhesive from adjacent discrete adhesive sections from seeping into each other, by providing a physical barrier between adjacent discrete adhesive sections. The support may help to control the thickness of the discrete adhesive sections, which may help to guarantee optimal bond line strength and robustness.

Optionally, the support is configured to provide a substantially fluid-tight seal between adjacent discrete adhesive sections. This may help to restrict and/or prevent fluid flow passing through the bond lines created by the discrete adhesive sections.

Optionally, the support comprises spaced apart ribs with the discrete adhesive sections located between the spaced apart ribs to form the herringbone pattern. The support may be used to hold the adhesive in place when assembling the aircraft structure, which may improve the ease of assembly of the aircraft structure.

According to a second aspect of the present invention, there is provided an aircraft structure comprising: a first surface; a second surface; and a support between the first surface and the second surface, wherein the support comprises a plurality of spaced apart ribs with discrete adhesive sections located between the spaced apart ribs.

The discrete adhesive sections may form a discontinuous bond line between the first surface and the second surface. The discontinuous bond line may help to prevent cracks from propagating along the bond line.

Optionally, the support is bonded to at least one of the first surface and the second surface. This may help to ensure that the support remains fixed in place relative to the first surface and the second surface. This may help to provide increased rigidity to the aircraft structure.

Optionally, the discrete adhesive sections have a substantially rectangular cross-sectional shape with a length to width ratio of at least 2:1. Optionally, wherein the length to width ratio is at least 3:1.

Optionally, a first discrete adhesive section of the plurality of discrete adhesive sections is adjacent to a second discrete adhesive section of the plurality of discrete adhesive sections and a longest edge of the first discrete adhesive section is orthogonal to a longest edge of the second discrete adhesive section. This may help to provide improved load support by providing adjacent discrete adhesive sections which extend in different directions on the surfaces.

Optionally, a first discrete adhesive section of the plurality of discrete adhesive sections is adjacent to a second discrete adhesive section of the plurality of discrete adhesive sections and a longest edge of the first discrete adhesive section is parallel to a longest edge of the second discrete adhesive section, wherein the first discrete adhesive section is offset from the second discrete adhesive section in a direction parallel to the longest edge of the first discrete adhesive section. This may help to redistribute load away from the first or second discrete adhesive sections in the event of a crack appearing in the first or second discrete adhesive sections.

Optionally, a third discrete adhesive section of the plurality of discrete adhesive sections is adjacent to both the first and second discrete adhesive sections and the second and third discrete adhesive sections overlap the longest edge of the first discrete adhesive section. Thus, a discrete adhesive section is overlapped by at least two further discrete adhesive sections along the longest edge of the discrete adhesive section. This may help to provide redundancy and improve load redistribution in the event of a crack appearing in the discrete adhesive section.

Optionally, the plurality of discrete adhesive sections comprises a first discrete adhesive section adjacent a second discrete adhesive section, and a third discrete adhesive section adjacent a fourth discrete adhesive section, wherein a longest edge of the first discrete adhesive section is parallel to a longest edge of the third discrete adhesive section and orthogonal to a longest edge of the second discrete adhesive section and the fourth discrete adhesive section, and wherein the first and fourth discrete adhesive sections overlap the longest edge of the third discrete adhesive section and the first and second discrete adhesive sections overlap the longest edge of the fourth discrete adhesive section. This pattern may be repeated multiple times on the first surface to form the herringbone pattern.

Optionally, the aircraft structure comprises at least part of a wing of an aircraft. Optionally, the aircraft structure comprises a primary structure of the aircraft.

According to a third aspect of the present invention, there is provided a method of bonding a first surface to a second surface, the method comprising: providing a first surface and a second surface; forming a plurality of discrete adhesive sections in a herringbone pattern on the first surface; moving the second surface toward the first surface such the discrete adhesive sections contact the first surface and the second surface; and curing the discrete adhesive sections to bond the first surface to the second surface.

By creating a herringbone pattern of discrete adhesive sections on the first surface, this may help to create a discontinuous bond line between the first surface and the second surface. Such a discontinuous bond line may help to arrest cracks that appear in the bond line as the cracks are less likely to propagate to an adjacent discrete section of adhesive.

Optionally, forming the plurality of discrete adhesive sections in the herringbone pattern comprises using a support to guide placement of an adhesive on the first surface in the herringbone pattern, wherein the support comprises a plurality of through-holes arranged in the herringbone pattern. The support may make it easier to apply a more consistent pattern of adhesive on the surface than manually applying the adhesive without the support. The pattern may be more easily repeatable, for example when the same support is used to apply adhesive to the first surface (or other surfaces) multiple times, which may improve the consistency of the applications of the adhesive.

Optionally, forming the plurality of discrete adhesive sections in the herringbone pattern comprises: loading the plurality of through-holes of the support with an adhesive; and placing the support on the first surface such that the adhesive contacts the first surface. In this way, the support is pre-impregnated with adhesive before being placed on the first surface. This may help to speed up the assembly process as the adhesive may be pre-loaded in the support, ready for application to the first surface. By loading the support with the adhesive before placing it on the first surface, this may help to prevent adhesive being spilt over the surface if applied after. The support may also help to hold the adhesive in a desired pattern and may make it easier to apply the adhesive to the surface.

Optionally, forming the plurality of discrete adhesive sections comprises: placing the support on the first surface; and loading the plurality of through-holes of the support with an adhesive when the support is on the first surface. This may allow the support to be adjusted into the correct position on the first surface before any adhesive is applied. The support may also be easier to handle before being places on the first surface as the apertures are not loaded adhesive.

Optionally, the method comprises removing the support from the first surface. Removing the support may help to reduce the weight of the final product. Moreover, the support may be reusable, which may help to reduce waste.

Optionally, removing the support from the surface occurs before curing. This may help to reduce the weight of the structure and may also allow the support to be reused.

Optionally, removing the support from the surface occurs after curing. The support may help to ensure that the adhesive remains in place during the curing process.

Optionally, removing the support comprises dissolving the adhesive support. This may allow for the support to be easily removed.

Optionally, the adhesive support is dissolved using a solvent. This may allow for the adhesive support to be removed even if the adhesive support is sandwiched between the first surface and the second surface.

Optionally, the method comprises cutting the support to a shape corresponding to at least one of the first surface and the second surface. This may allow the shape of the adhesive support to be tailored to the surface to which it is being placed on, which may help to ensure maximum coverage of the first surface and/or second surface by the support.

Optionally, cutting the adhesive support to the shape occurs before loading the plurality of apertures with the adhesive. Optionally, the adhesive support is cut from a supply of adhesive support.

Optionally, the method comprises curing the adhesive by applying a UV light to the adhesive. UV curing allows for lower temperatures to be used to cure the adhesive compared to curing the adhesive in an oven. UV curing may also help to speed up the curing process compared to curing the adhesive in an oven.

Optionally, curing the adhesive comprises applying heat to the adhesive. Optionally, parts of the adhesive are selectively cured. In this way, different parts of the adhesive can be cured at different times and/or rates. Which parts of the adhesive are cured and how quickly they are cured may be controlled. For example, curing may be slowed down in areas which require greater bond strength and may be sped up in areas which require relatively weaker bond strength (or do not require as strong a bond).

Optionally, the support comprises a non-stick material. This may make it easier to remove the support and/or may make the adhesive less likely to bind to the support.

According to a fourth aspect of the present invention, there is provided a support for applying an adhesive to a surface, the support comprising a plurality of through-holes arranged in a herringbone pattern.

The support may help to hold an adhesive in a desired pattern. This may also make it easier to apply the adhesive to a surface. The plurality of through-holes in the support may also help to produce a discontinuous series of adhesive patches on a surface when the support is applied to the surface. The herringbone pattern may help to provide increase structural strength in the event of a fracture, when the adhesive is applied between two surfaces to bond the surfaces together.

Optionally, adjacent through-holes of the plurality of apertures are spaced apart by at least 0.1 mm. This may help to ensure that adjacent patches of adhesive do not seep into each other and combine when applied to the surface. Optionally, adjacent through-holes of the plurality of apertures are spaced apart by at least 0.5 mm. Optionally, adjacent through-holes of the plurality of apertures are spaced apart by at least 1 mm.

Optionally, the plurality of through-holes are defined by a plurality of walls extending from a first face of the planar sheet to a second face of the planar sheet, and the plurality of walls comprise a non-stick coating. This may help to reduce the likelihood of the adhesive bonding to the support compared to a support without the non-stick coating. This may help with removing the support from the surface compared to a support without the non-stick coating. Optionally, the non-stick coating comprises polytetrafluoroethylene (PTFE). Optionally, at least one of the first face and the second face comprises a self-adhesive material. This may help to hold the support in place when it is applied to a surface.

Optionally, the support comprises a UV transmissive material. This may allow UV light to more easily pass through the support and when the adhesive is UV curable, this may help with curing the adhesive.

Optionally, the support comprises a heating element configured to apply heat to the discrete adhesive sections. The heating element may help to speed up curing of an adhesive by providing a heat source in close proximity to the discrete adhesive sections. Moreover, the heating element may comprise a series of discrete zones, such that the adhesive can be selectively heated.

According to a fifth aspect of the present invention, there is provided an aircraft comprising the aircraft structure according to the first aspect of the present invention or the second aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
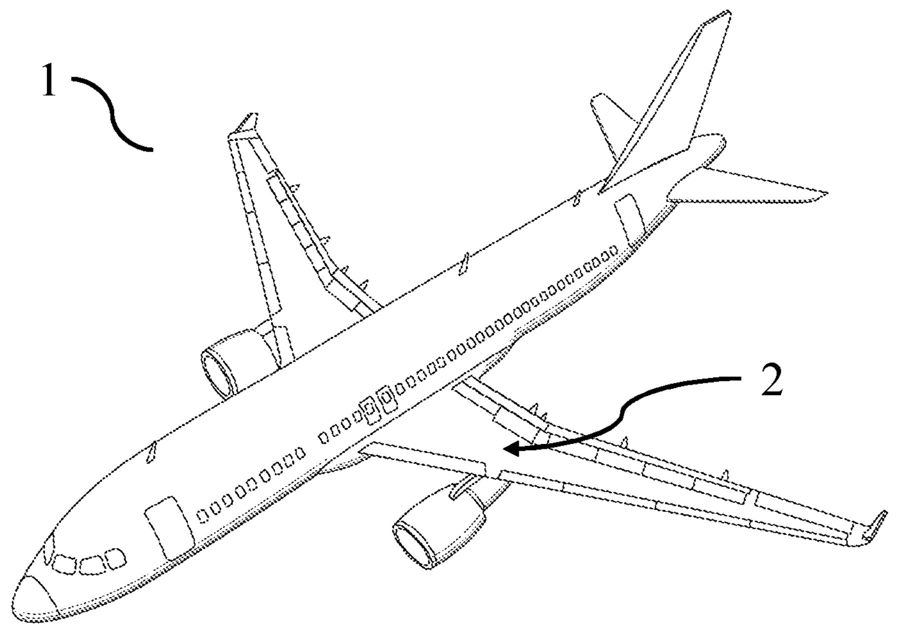
FIG. 1 shows a schematic view of an aircraft.

FIG. 1 shows a schematic isometric view of an aircraft 1. During assembly of the aircraft 1, various surfaces are bonded together to form aircraft structures. For example, surfaces are bonded together to form an aircraft structure which is a part of a wing 2 of the aircraft 1.

Figure 2:
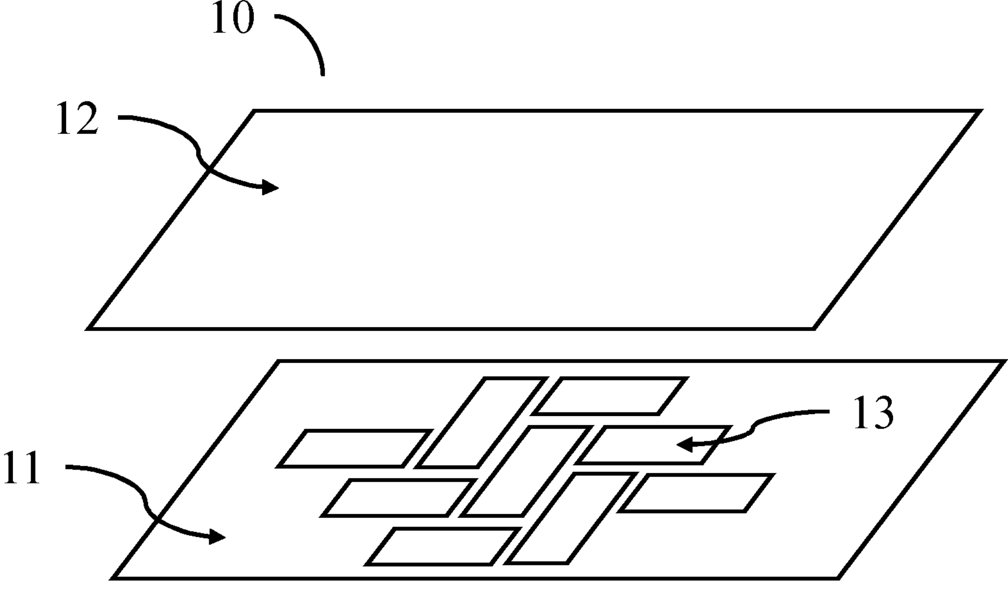
FIG. 2 shows a schematic isometric view of an aircraft structure.

FIG. 2 shows a schematic view of the aircraft structure 10 which forms part of the wing 2 of the aircraft. The aircraft structure 10 comprises a first surface 11 and a second surface 12. FIG. 2 shows the first surface 11 and the second surface 12 before being bonded together. To bond the first surface 11 to the second surface 12, discrete adhesive sections 13 (including first 13*a*, second 13*b*, third 13*c*, fourth 13*d*, fifth 13*e*, sixth 13*f* and seventh 13*g* discrete adhesive sections) of adhesive are provided on the first surface 11. The first discrete adhesive section 13*a* and the second discrete adhesive section 13*b* form an inverted L-shape nested within an inverted L-shape formed by the third discrete adhesive section 13*c* and the fourth discrete adhesive section 13*d*. These inverted L-shapes of discrete adhesive sections 13 repeat across the first surface 11 to form the herringbone pattern.

The discrete adhesive sections 13 are substantially rectangular in shape with a length to width ratio of around 2:1, i.e., the length of the discrete adhesive sections 13 is approximately twice the width. The discrete adhesive sections are arranged in a herringbone pattern (shown in more detail in FIG. 3) and the first discrete adhesive section 13*a* is surrounded by the second, third, fourth, fifth, sixth and seventh discrete adhesive sections 13*b*, 13*c*, 13*d*, 13*e*, 13*f*, 13*g*. The first discrete adhesive section 13*a* is adjacent to the second discrete adhesive section 13*b* and the third discrete adhesive section 13*c* in a first direction (indicated by arrow X) and a length of the first discrete adhesive section 13*a* (i.e. the longest edge of the first discrete adhesive section 13*a*) is orthogonal to a length of the second discrete adhesive section 13*b*. The first discrete adhesive section 13*a* is also offset from the third discrete adhesive section 13*c* in a second direction (as indicated by arrow Y in FIG. 3).

Figures 3, 4:
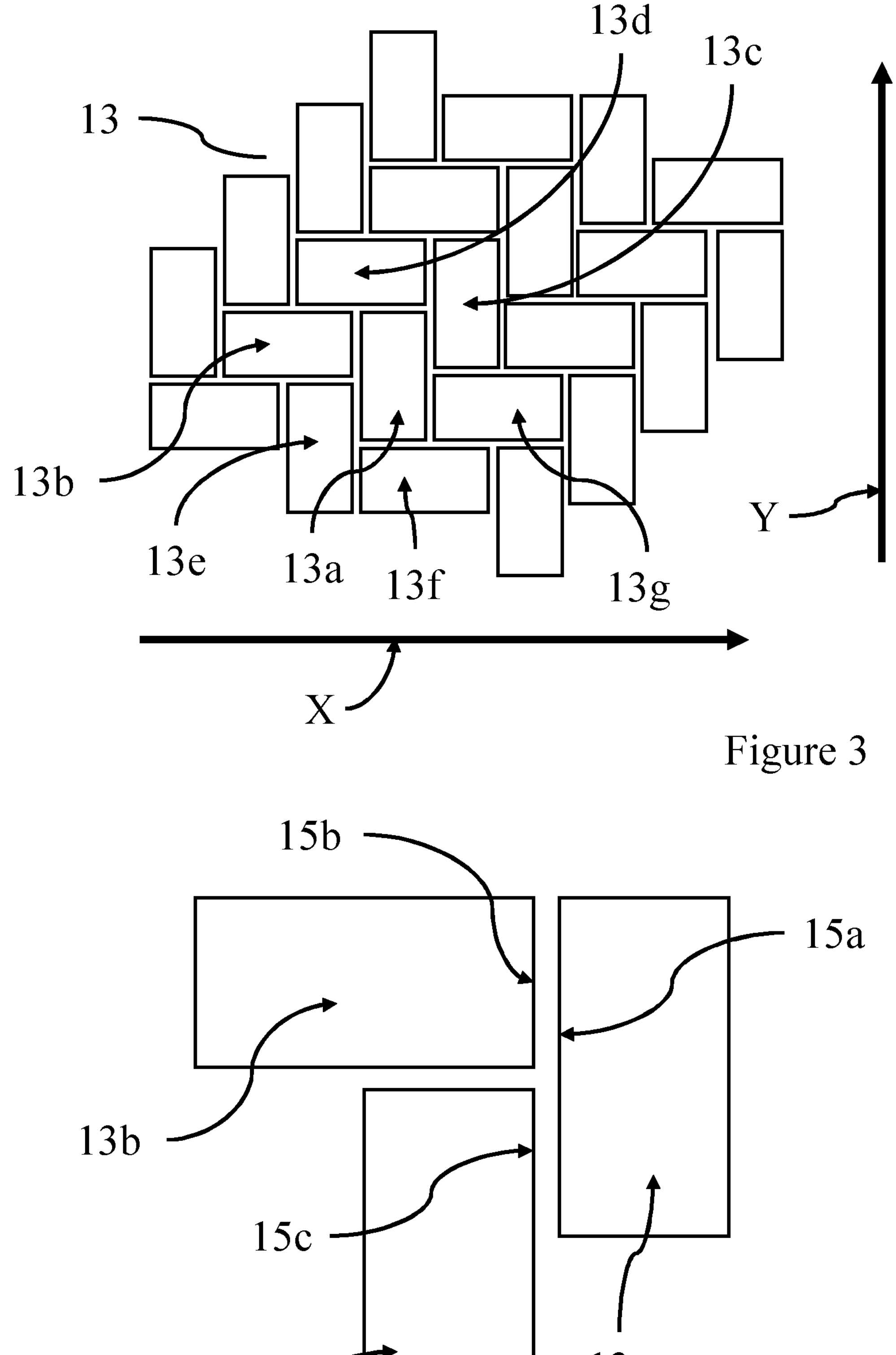
FIG. 3 shows a schematic view of a pattern of discrete adhesive sections.
FIG. 4 shows a schematic view of a part of the pattern of FIG. 3.

In the herringbone pattern, adjacent discrete adhesive sections 13 are spaced apart from each other and each discrete adhesive section 13 is overlapped and/or surrounded by multiple adjacent discrete adhesive sections 13. FIG. 4 shows a zoomed in schematic view of a part of the herringbone pattern of FIG. 3. As shown in FIG. 4, an edge 15*a* of the first discrete adhesive section 13*a* is overlapped by an edge 15*b* of the second discrete adhesive section 13*b* and an edge 15*c* of the fifth discrete adhesive section 15*e*. As such, two discrete adhesive sections (i.e., the second and fifth discrete adhesive sections 13*b*, 13*e*) overlap the edge 15*a* of the first discrete adhesive section 13*a*.

Figure 5:
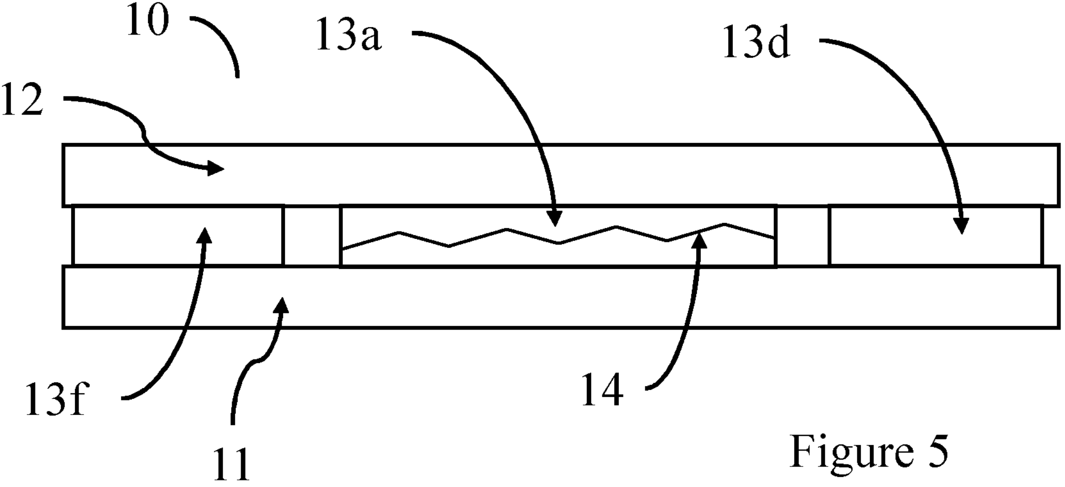
FIG. 5 shows a schematic partial cross-sectional view of the aircraft structure of FIG. 2.

The herringbone pattern may help to provide improved structural support should a crack occur in one of the discrete adhesive sections 13. For example, if a crack 14 were to form in the first discrete adhesive section 13*a* (as shown in FIG. 5), the load would be redistributed to the second through seventh discrete adhesive sections 13*b-g* surrounding the first discrete adhesive section 13*a*. This may help to provide redundancy in the event of a crack in one of the discrete adhesive sections. If a continuous bond line was used to bond the first surface 11 to the second surface 12, if the bond line cracked there would be no remaining bond between the first surface 11 and the second surface 12. This would then require immediate maintenance to repair. In the example of FIGS. 2 to 5, the first surface 11 and the second surface 12 remain bonded together even if a crack appears in a discrete adhesive section 13, which may allow more time before maintenance is required.

As the lengths of discrete adhesive sections 13 surrounding the first adhesive section 13*a* in the herringbone pattern do not all extend in the same direction (e.g., the length of the second discrete adhesive section 13*b* is orthogonal to the length of the first adhesive section 13*a*), this helps to provide improved load support in the event of a crack appearing in one of the discrete adhesive section 13. For example, if a crack appeared in the first adhesive section 13*a* and the load on the discrete adhesive sections 13 was in the second direction Y, the load would primarily be redistributed into the discrete adhesive sections 13 surrounding the first discrete adhesive section 13*a* which have lengths extending in the second direction Y (e.g., the third discrete adhesive section 13*c* and the fifth discrete adhesive section 13*e*). If the load on the discrete adhesive sections 13 was in the first direction X, the load would primarily be redistributed into the discrete adhesive sections 13 surrounding the first discrete adhesive section 13*a* which have lengths extending in the first direction X (e.g., the second discrete adhesive section 13*b*, the fourth discrete adhesive section 13*d*, the sixth discrete adhesive section 13*f* and the seventh discrete adhesive section 13*g*).

FIG. 5 shows a schematic cross-sectional side view of the aircraft structure 10 after the first surface 11 has been bonded to the second surface 12. As seen in FIG. 5, the first, fourth and sixth discrete adhesive sections 13*a*, 13*d*, 13*f* form a discontinuous bond line between the first surface 11 and the second surface 12. As such, if a crack 14 appears in the first discrete adhesive section 13*a*, the discontinuity between the first discrete adhesive section 13*a* and the fourth and sixth discrete adhesive sections 13*d*, 13*f* may help to prevent the crack from propagating to the fourth and/or sixth discrete adhesive sections 13*d*, 13*f*. As discussed above, the surrounding discrete adhesive sections 13 then support the load from the cracked first discrete adhesive section 13*a*.

Figure 6:
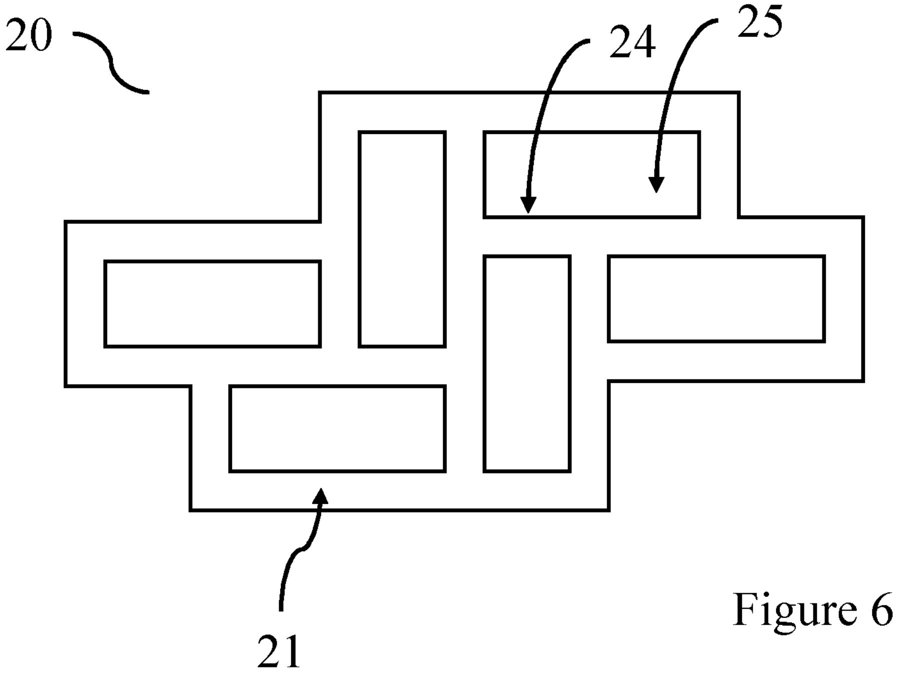
FIG. 6 shows a schematic view of a support.
Figure 7:
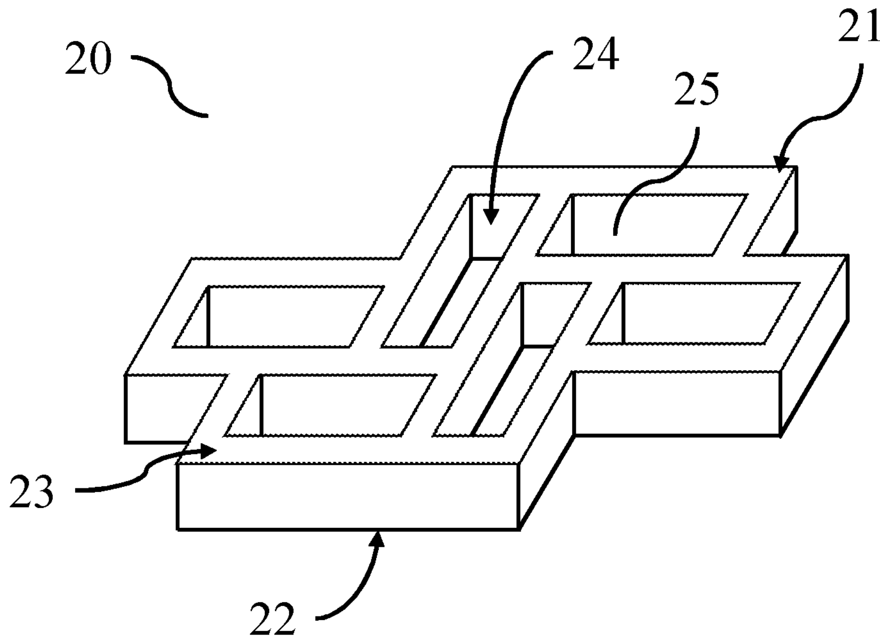
FIG. 7 shows a schematic isometric view of the support of FIG. 6.

A support 20, a part of which is shown in FIGS. 6 and 7, is used to create the herringbone pattern of discrete adhesive sections 13 on the first surface 11. The support 20 comprises ribs 21 which define through-holes 25 that extend through the support 20 between a first face 22 of the support 20 and a second face 23 of the support 20. Each of the through-holes 25 is defined by four walls 24 which extend between the first face 22 and the second face 23. To help prevent the adhesive from bonding to the walls 24, the walls 24 are coated in a non-stick material, such as polytetrafluoroethylene (PTFE). As shown in FIGS. 6 and 7, the through-holes 25 defined by the ribs 21 are arranged in the herringbone pattern. The support 20 is used as a stencil/mask when applying adhesive to the first surface 11, to create the herringbone pattern of discrete adhesive sections 13 on the first surface 11.

Figure 8:
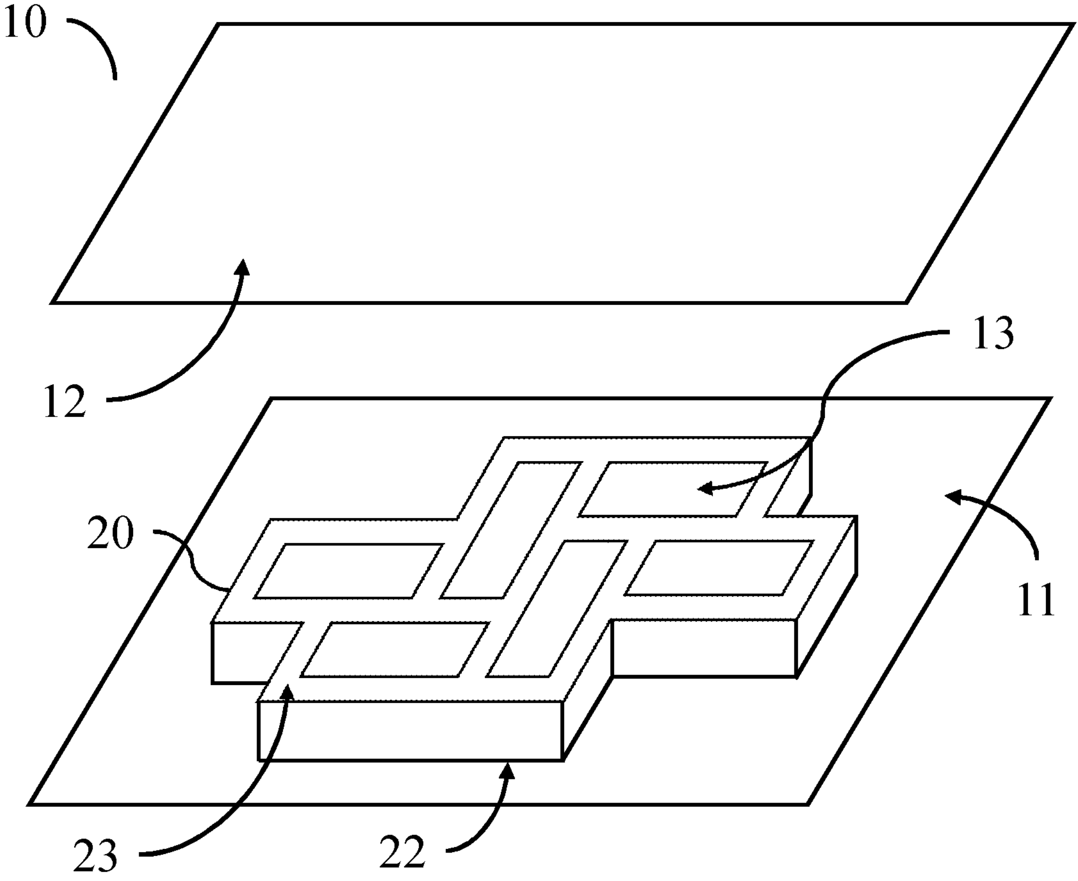
FIG. 8 shows a schematic isometric view of an aircraft structure.

As illustrated in FIG. 8, in use the support 20 is placed on the first surface 11 such that the first face 22 of the support 20 is in contact with the first surface 11. The first face 22 comprises a self-adhesive material to secure the support 20 to the first surface 31 to hold the support 20 in a fixed position relative to the first surface 11. The adhesive is applied to the support 20 to fill the through-holes 25 such that the adhesive contacts the first surface 11. The support 20 is then removed from the first surface 11 to leave behind the discrete adhesive sections 13 in the herringbone pattern. Due to a viscosity of the discrete adhesive sections 13, the discrete adhesive sections 13 retain their shape in the herringbone pattern on the first surface 11 after the support 20 is removed from the first surface 11. The viscosity of the discrete adhesive sections 13 can be increased by partially curing the discrete adhesive sections 13 before removing the support 20 from the first surface 11.

Figure 9:
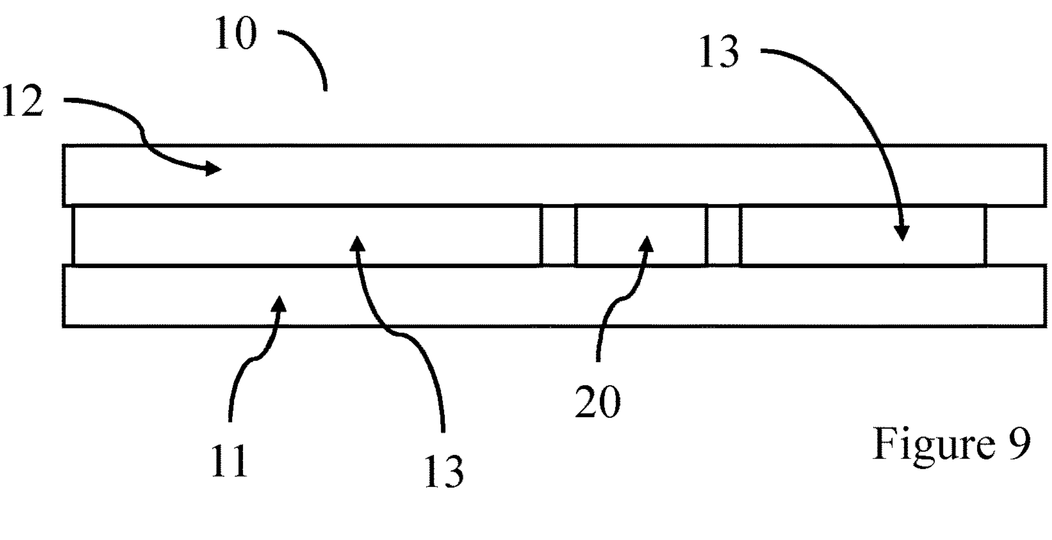
FIG. 9 shows a schematic partial cross-sectional view of the aircraft structure of FIG. 8.

The support 20 can either be removed from the first surface 11 before the second surface 12 is bonded to the first surface 11 (as shown in FIG. 5), or can remain on the first surface 11 until after the second surface 12 has been bonded to the first surface 11. FIG. 9 shows a partial cross-sectional view of the aircraft structure 10 when the support 20 is not removed before the second surface 12 is bonded to the first surface 11.

The support 20 provides a physical barrier between adjacent discrete adhesive sections 13 which may help to prevent the adjacent discrete adhesive sections 13 from seeping into, and bonding with, each other during or before curing. This helps to prevent a continuous bond line forming between the first surface 11 and the second surface 12. The support 20 also provides a substantially fluid-tight seal between the adjacent discrete adhesive sections 13 by substantially filling the space between the adjacent discrete adhesive sections 13. This may help to prevent or inhibit fluid flow past the discrete adhesive sections 13. This may be particularly advantageous when a fluid (e.g. fuel) is stored adjacent the first surface 11 and/or the second surface 12 as the substantially fluid-tight seal created by the support 20 may prevent the fluid from leaking through the discontinuous bond line.

The support 20 is also configured to control a thickness of the discrete adhesive sections 13 on the first surface 11 by reducing the amount of compression applied to the discrete adhesive sections 13 by relative movement of the first surface 11 and the second surface 12. During assembly, when the second surface 12 moves toward the first surface 11, a force is applied between the first surface 11 and the second surface 12 to ensure that the discrete adhesive sections 13 have sufficient contact with the first surface 11 and the second surface 12. However, this force may also compress the discrete adhesive sections 13, causing the discrete adhesive sections 13 to lose their shape, reduce in thickness and potentially seep into each other. To control the thickness of the discrete adhesive sections 13, the support 20 comprises a material which is resistant to being significantly deformed when a force is applied between the first surface 11 and the second surface 12. The amount that the support 20 will deform is known, allowing for control over the thickness of the discrete adhesive sections 13. This helps the support 20 to maintain a spacing between the first surface 11 and the second surface 12 to reduce the likelihood of the discrete adhesive sections 13 being compressed by the force applied between the first surface 11 and the second surface 12. A height of the support (i.e. the dimension of the support which extends from the first face 22 to the second face 23) can be selected/adjusted to result in a desired thickness of the discrete adhesive sections 13.

After the first surface 11 and the second surface 12 have been bonded together (as shown in FIG. 9), if the support 20 is no longer required it is removed from the aircraft structure 10. This may help to reduce the overall weight of the aircraft structure 10. To remove the support 20, a solvent is applied to the support 20 to dissolve the support 20. The solvent is selected such that it entirely dissolves the support 20 but does not affect the discrete adhesive sections 13.

Figure 10:
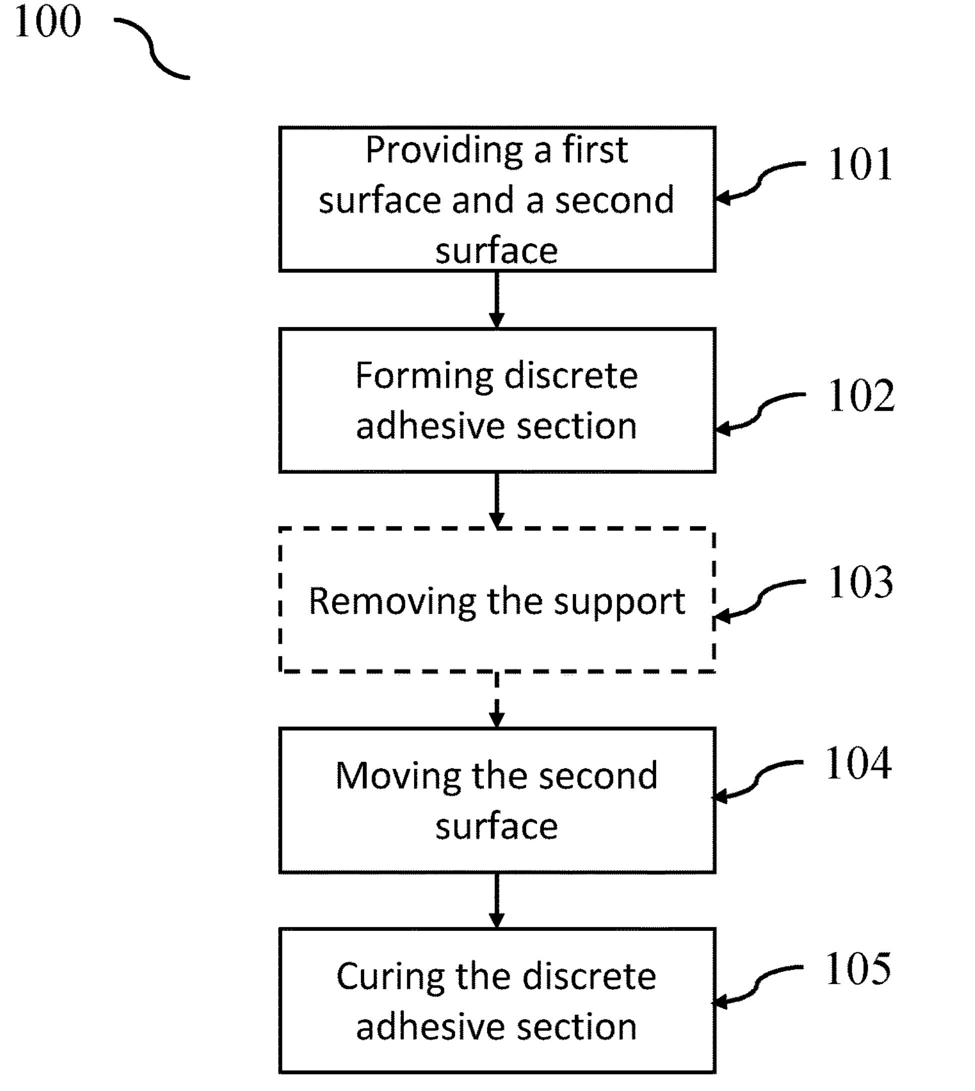
FIG. 10 shows a flow diagram of a method of bonding a first surface to a second surface.

FIG. 10 shows a flow diagram of a method 100 of bonding the first surface 11 to the second surface 12. The method 100 comprises providing 101 the first surface 11 and the second surface and forming 102 a plurality of discrete adhesive sections 13 in a herringbone pattern on the first surface 11. As discussed in relation to FIGS. 2 to 8, the discrete adhesive sections 13 are formed in the herringbone pattern using the support 20. The support 20 helps to guide the placement of the adhesive on the first surface 11 in the herringbone pattern.

To form the plurality of discrete adhesive sections 13 on the first surface 11, the support 20 is placed onto the first surface 11 such that the first face 22 of the support 20 abuts against the first surface 11. The adhesive is then applied to the support 20 and inserted into the through-holes 25 of the support 20 to load the through-holes 25 with the adhesive. As the through-holes 25 extend through the support 20, the adhesive also contacts the first surface 20. In some examples, the support 20 is placed on the first surface 11 multiple times in different positions to create the repeating herringbone pattern.

Once the adhesive has been applied to the support 20, the method 100 comprises removing 103 the support 20 from the first surface 11. The support 20 is removed by lifting the support 20 up and away from the first surface 11. This leaves behind the discrete adhesive sections 13 in the herringbone pattern on the first surface 11.

After the support 20 has been removed from the first surface, the method 100 comprises moving 104 the second surface 12 toward the first surface 11 such that the discrete adhesive sections 13 contact the first surface 11 and the second surface 12. A force is applied between the first surface 11 and the second surface 12 to move the first surface 11 and the surface 12 towards each other. This may help to ensure that the discrete adhesive sections 13 have sufficient contact with the first surface 11 and the second surface 12 to cause bonding.

The method 100 then comprises curing 105 the discrete adhesive sections 13 to bond the first surface 11 to the second surface 12. The first surface 11 and the second surface 12 are held in position relative to each other during curing to help to prevent misalignment. Curing 105 the discrete adhesive sections 13 is achieved by heating the first surface 11, second surface 12 and discrete adhesive sections 13 in an oven to a predefined temperature. Alternatively, other curing methods may be used, such a UV curing. Where UV curing is used, the support 20 comprises a UV transmissive that allows UV light to more easily pass through the support 20 to reach the discrete adhesive sections 13.

Although in the method 100 of FIG. 10, adhesive is inserted into the through-holes 25 of the support 20 when the support 20 is on the first surface, in some examples adhesive is inserted into the through-holes 25 before the support 20 is placed on the first surface 11. In this way, the support 20 is pre-impregnated with adhesive which may make it easier to apply adhesive to the first surface 11 and may reduce the likelihood of spilling adhesive compared to applying the adhesive when the support 20 is on the first surface 11. In some examples, the support 20 is provided pre-impregnated with adhesive. This may speed up the assembly process as adhesive is applied to the first surface 11 at the same time as applying the support 20 to the first surface.

In the method of FIG. 10, removing the support 20 from the first surface 11 occurs before the second surface 12 is bonded to the first surface 11. In some examples removing 103 the support from the first surface 11 occurs after the first surface 11 has been bonded to the second surface 12 or is omitted entirely.

Figure 11:
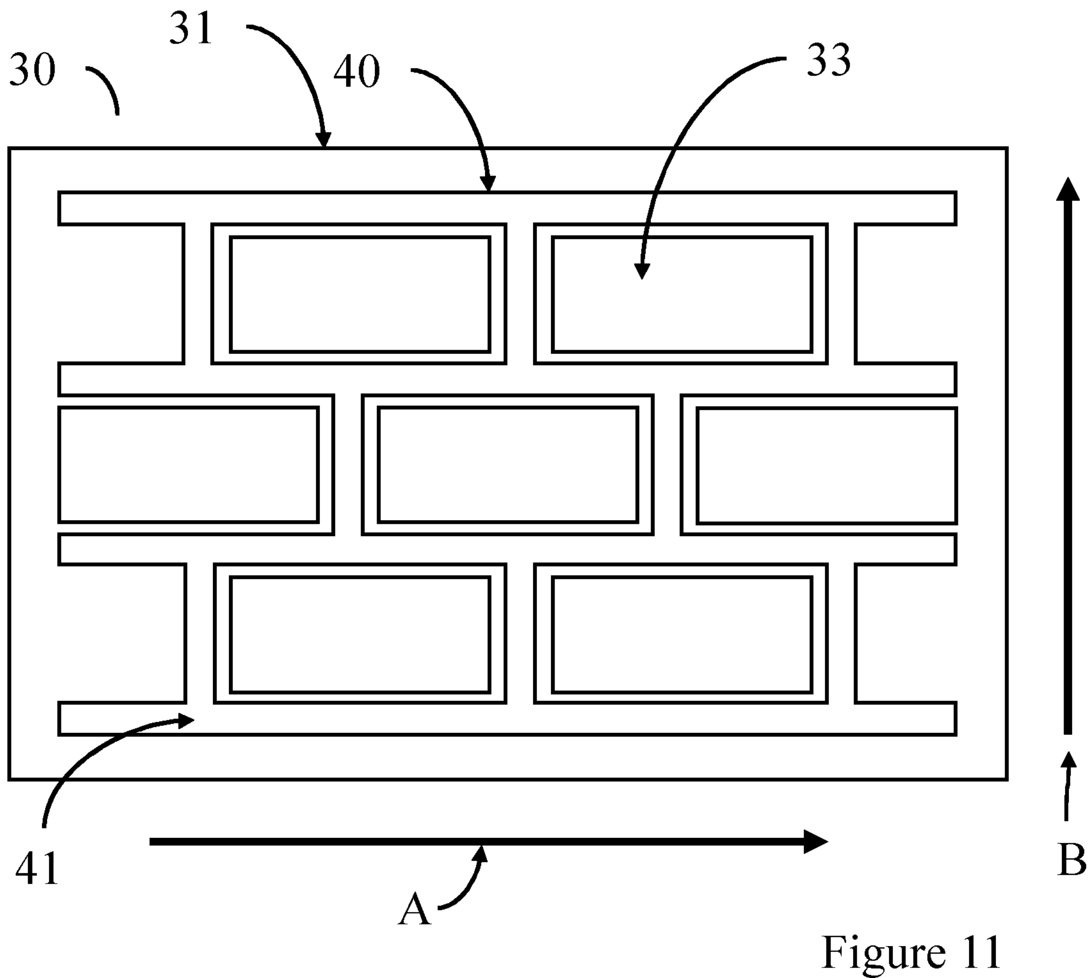
FIG. 11 shows a schematic view of a further aircraft structure.

FIG. 11 shows a schematic top view of an aircraft structure 30 comprising a first surface 31 and a support 40 provided on the first surface 31. The support 40 comprises a plurality of ribs 41 with discrete adhesive sections 33 located between the ribs 41. The support 40 helps to create a discontinuous pattern of discrete adhesive sections 33 on the first surface 31. Like in the example discussed in relation to FIGS. 2 to 9, the discrete adhesive sections 33 are rectangular in shape. In FIG. 11, the discrete adhesive sections 33 are not arranged in a herringbone pattern but are instead arranged in ordered rows. Lengths (i.e., the longest edge) of adjacent discrete adhesive sections 33 in a first direction (indicated by arrow A) are offset from each other in a second direction (indicated by arrow B), the first direction A and the second direction B are orthogonal to each other and are both being parallel to the first surface 31.

Although in FIG. 11 the discrete adhesive sections 33 are rectangular in shape, in some examples the discrete adhesive sections 33 have a different shape, such as a substantially circular, square or diamond shape. The discrete adhesive sections 33 may have a substantially square shape and be arranged on the first surface 31 in a checkerboard pattern where alternate rows of the checkerboard pattern are offset from each other (like the pattern shown in FIG. 11).

Figure 12:
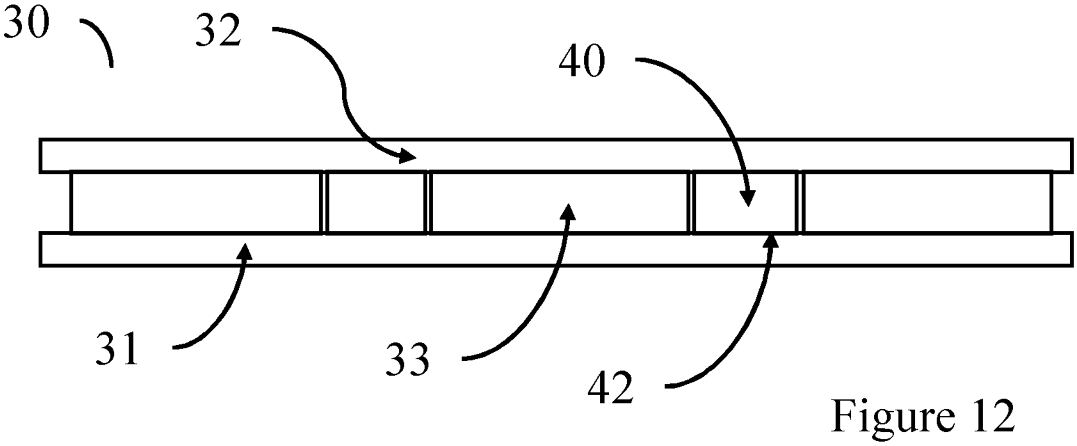
FIG. 12 shows a schematic partial cross-sectional view of the aircraft structure of FIG. 11.

FIG. 12 shows a schematic cross-sectional side view of the aircraft structure 30 of FIG. 11 after the second surface 32 has been bonded to the first surface 31. As shown in FIG. 11, the support 40 is present between the first surface 31 and the second surface 32 after the second surface 32 is bonded to the first surface 31. The support 40 comprises a first face 42 which abuts the first surface 31.

Figure 13:
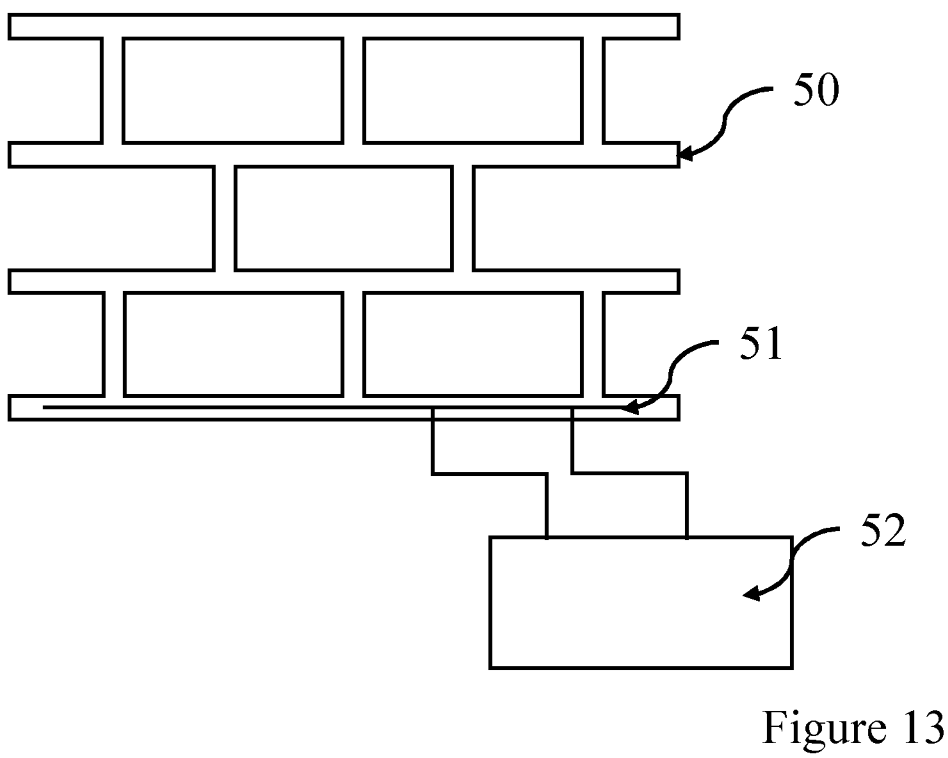
FIGS. 13 to 15 show schematic views of further supports.
Figure 14:
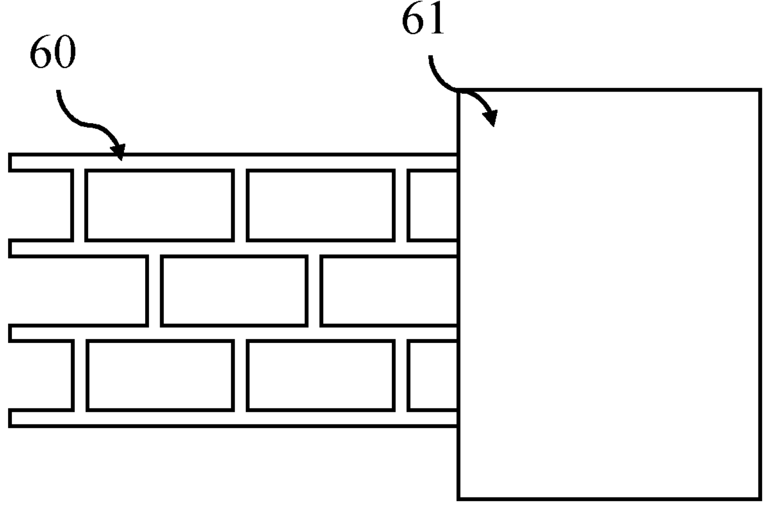
Figure 15:
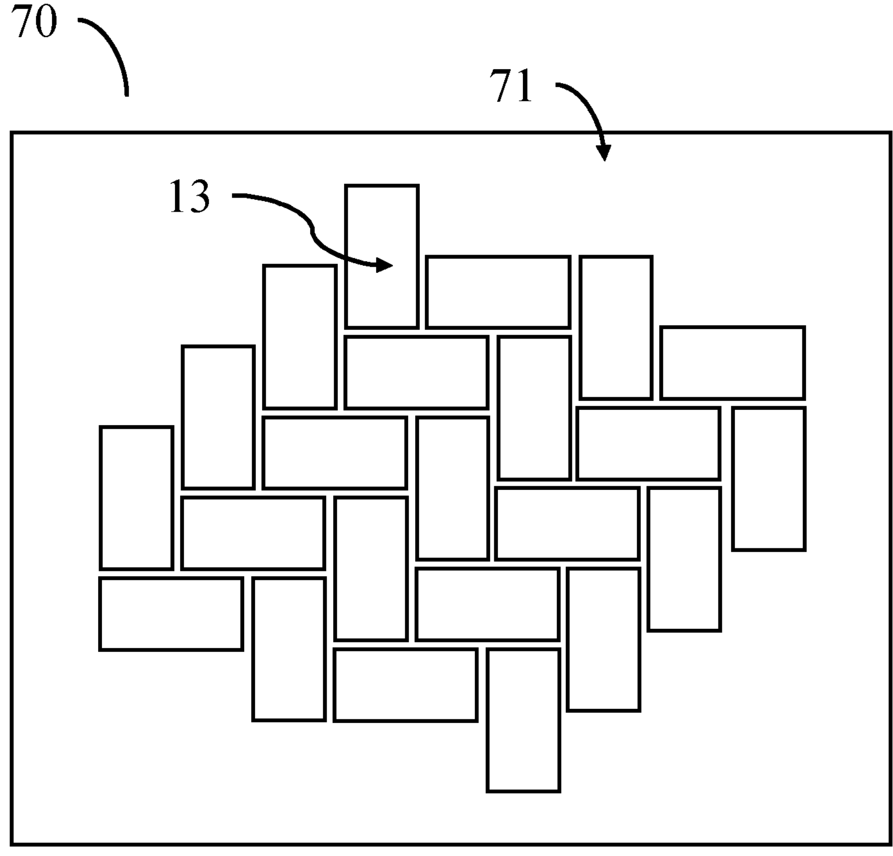

FIGS. 13 to 15 show further examples of a support for use in bonding together surfaces. In FIG. 13, the support 50 comprises a heating element 51 which is disposed within the support 50. The heating element 51 is attached to a controller 52 which is configured to control operation of the heating element 51. The heating element 51 is configured to be activated during curing of the discrete adhesive sections 13, 33. The heat provided by the heating element 51 may help to speed up or otherwise control the curing process.

FIG. 14 shows a support 60 which is configured to be cut from a supply 61 of the support 60. The support 60 may be cut from the supply 61 to a shape which fits the surface to which it is being applied.

FIG. 15 shows a support 70 comprising a transfer sheet 70 onto which the herringbone pattern of discrete adhesive sections 13 is created. The discrete adhesive sections 13 are formed on the transfer sheet 70 remote from the first surface 11. In use, the support 70 is placed against the first surface 11 such that the discrete adhesive sections 13 in the herringbone pattern contact the first surface 11. The transfer sheet 71 is then peeled away from the first surface 11, leaving behind the discrete adhesive sections 13 in the herringbone pattern on the first surface 11.

The features of the supports of FIGS. 13 to 15 may also be used instead of, or in conjunction with, the features of the supports 20, 40 discussed in relation to FIGS. 6 to 9, 11 and 12. Although the above discussion focuses on bonding together surfaces to form an aircraft structure and the use of supports to do this, the concepts may equally be applied to bonding together surfaces of other structures. For example, the supports may be used in bonding together surfaces of marine vessels, racing cars or other vehicles.

It is noted that the term "or" as used herein is to be interpreted to mean "and/or", unless expressly stated otherwise.

The invention claimed is:

1. A load bearing structure of an aircraft, the load bearing structure comprising:

a first surface of the load bearing structure of the aircraft, a second surface of the load bearing structure of the aircraft, and a plurality of discrete adhesive sections, wherein the first surface and the second surface are bonded together via the plurality of discrete adhesive sections which are arranged in a herringbone pattern, wherein the discrete adhesive sections bond together the first surface and the second surface.

2. The load bearing structure according to claim 1, wherein adjacent discrete adhesive sections of the plurality of discrete adhesive sections are spaced apart from each other in a direction substantially parallel to the first surface.

3. The load bearing structure according to claim 2, further comprising a support between the adjacent discrete adhesive sections, wherein the support is adjacent to each of the discrete adhesive sections, and the support extends from the first surface to the second surface and substantially fills openings between the adjacent discrete adhesive sections.

4. The load bearing structure according to claim 3, wherein the support is configured to provide a substantially fluid-tight seal between the adjacent discrete adhesive sections.

5. The load bearing structure according to claim 3, wherein the support comprises spaced apart ribs with the adjacent discrete adhesive sections located between the spaced apart ribs to form the herringbone pattern.

6. A load bearing structure of an aircraft, the load bearing structure comprising:
- a first surface of the load bearing structure of an aircraft;
- a second surface of the load bearing structure of the aircraft;
- a support between the first surface and the second surface, wherein the support comprises spaced apart ribs arranged in an array, and
- a plurality of discrete adhesive sections located in openings in the array;
- wherein the openings are between and defined by the spaced apart ribs,
- wherein the first surface and the second surface are bonded together by the discrete adhesive sections;
- wherein the discrete adhesive sections are arranged in a herringbone pattern, and
- wherein the spaced apart ribs extend from the first surface to the second surface.

7. The load bearing structure according to claim 6, wherein the support is bonded to at least one of the first surface and the second surface.

8. The load bearing structure according to claim 1, wherein the discrete adhesive sections have a substantially rectangular cross-sectional shape with a length to width ratio of at least 2:1.

9. The load bearing structure according to claim 1, wherein a first discrete adhesive section of the plurality of discrete adhesive sections is adjacent to a second discrete adhesive section of the plurality of discrete adhesive sections and a longest edge of the first discrete adhesive section is orthogonal to a longest edge of a second discrete adhesive section.

10. The load bearing structure according to claim 1, wherein a first discrete adhesive section of the plurality of discrete adhesive sections is adjacent to a second discrete adhesive section of the plurality of discrete adhesive sections and a longest edge of the first adhesive section is parallel to a longest edge of the second adhesive section, and wherein the first discrete adhesive section is offset from the second discrete adhesive section in a direction parallel to the longest edge of the first discrete adhesive section.

11. The load bearing structure according to claim 10, wherein a third discrete adhesive section of the plurality of discrete adhesive sections is adjacent to both the first and second discrete adhesive sections and the second and third discrete adhesive sections overlap a longest edge of the first discrete adhesive section.

12. An aircraft comprising a load bearing structure of an aircraft, wherein the load bearing structure includes:
- a first surface,
- a second surface, and
- a plurality of discrete adhesive sections between the first surface and the second surface and bonded to the first surface and the second surface,
- wherein the first surface and the second surface are bonded together via the plurality of discrete adhesive sections arranged in a herringbone pattern to form at least a portion of the load bearing structure of the aircraft.

13. The aircraft of claim 12, wherein the load bearing structure is a portion of a wing.

14. The load bearing structure of claim 1, wherein the load bearing structure is at least a portion of a wing.

15. The load bearing structure of claim 6, wherein the load bearing structure is at least a portion of a wing.

* * * * *